(12) United States Patent
Silverstein et al.

(10) Patent No.: US 11,658,963 B2
(45) Date of Patent: May 23, 2023

(54) COOPERATIVE COMMUNICATION VALIDATION

(71) Applicant: INTERNATIONAL BUSINESS MACHINES CORPORATION, Armonk, NY (US)

(72) Inventors: Zachary A. Silverstein, Jacksonville, FL (US); Victor Povar, Vancouver (CA); Mauro Marzorati, Lutz, FL (US); Shikhar Kwatra, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 16/702,938

(22) Filed: Dec. 4, 2019

(65) Prior Publication Data
US 2021/0176234 A1 Jun. 10, 2021

(51) Int. Cl.
*H04L 9/40* (2022.01)
(52) U.S. Cl.
CPC ........ *H04L 63/0853* (2013.01); *H04L 63/083* (2013.01); *H04L 63/0884* (2013.01)
(58) Field of Classification Search
CPC .............. H04L 63/0853; H04L 63/083; H04L 63/0884
USPC .......................................................... 726/9
See application file for complete search history.

(56) References Cited

U.S. PATENT DOCUMENTS

| | | | |
|---|---|---|---|
| 8,316,237 B1 | 11/2012 | Felsher | |
| 8,453,226 B2 | 5/2013 | Hammad | |
| 8,631,466 B2 | 1/2014 | Cha | |
| 10,164,983 B2 | 12/2018 | Chen | |
| 10,219,154 B1 * | 2/2019 | Hallock | H04L 63/0853 |
| 2015/0113275 A1 | 4/2015 | Kim | |
| 2016/0234182 A1 | 8/2016 | Bone | |
| 2017/0359334 A1 * | 12/2017 | Maddox | G10L 17/24 |

(Continued)

FOREIGN PATENT DOCUMENTS

| | | |
|---|---|---|
| CN | 101316169 A | 12/2008 |
| CN | 103282923 B | 2/2017 |
| WO | 2019009928 A1 | 1/2019 |

OTHER PUBLICATIONS

IBM, "IBM SmartCloud Monitoring-Application Insight Version 1.2.0.1, Certificate Examination for Communication With VMware Enable", Sep. 10, 2019, https://www.ibm.com/support/knowledgecenter/en/SSWGCQ_1.2.0/com.IBM.scmai.doc_1.2/install/scmai_installvmware_cert, pp. 1-2.

(Continued)

*Primary Examiner* — Brandon Hoffman
(74) *Attorney, Agent, or Firm* — Brandon L. Stephens

(57) ABSTRACT

A method, a computer program product, and a computer system transmit an authenticated communication. The method being performed by a sending device includes transmitting a request to an authentication server indicating that the authenticated communication is to be transmitted. The method includes receiving a security token from a security device that is co-located with the sending device. The security token is received by the security device from the authentication server. The method includes generating the authenticated communication by incorporating the security token in a communication. The method includes transmitting the authenticated communication to a recipient device.

20 Claims, 8 Drawing Sheets

(56) References Cited

U.S. PATENT DOCUMENTS

| | | | |
|---|---|---|---|
| 2017/0364875 A1 | 12/2017 | Efroni | |
| 2018/0137512 A1* | 5/2018 | Georgiadis | H04L 63/08 |
| 2018/0183802 A1 | 6/2018 | Choyi | |
| 2018/0295120 A1 | 10/2018 | Dawson | |
| 2019/0110195 A1 | 4/2019 | Ito | |
| 2021/0344674 A1* | 11/2021 | Chen | G06F 21/45 |

OTHER PUBLICATIONS

Kelly, "Robocalls are Getting Worse-How Do We Stop them?", May 3, 2019, https://www.theverge.com/2019/5/3/18525784/robocalls-spam-calls-solu . . . , pp. 1-6.

Mell et al., "The NIST Definition of Cloud Computing", National Institute of Standards and Technology, Special Publication 800-145, Sep. 2011, pp. 1-7.

Peyrott, "Using Machine to Machine (M2M) Authorization", Jul. 11, 2018, https://auth0.com/blog/using-m2m-authorization/, pp. 1-8.

* cited by examiner

US 11,658,963 B2

COOPERATIVE COMMUNICATION VALIDATION

BACKGROUND

The exemplary embodiments relate generally to validating communications, and more particularly to a cooperative mechanism involving a token received by a sender through a co-located intermediary for inclusion in a communication such that a recipient of the communication may validate the communication.

A first device may communicate with a second device through a variety of transmission mechanisms. For example, a first user utilizing the first device may contact a second user utilizing the second device to transmit a communication through text, video, voice, etc. However, a communication may be difficult to validate where a recipient ensures an identity of a sender of the communication as a genuine entity from which the communication is to be received. Hackers and spammers are using increasingly strong methods of spoofing for costly spear phishing attacks. For example, a spammer may utilize a robocall mechanism in which an identity is spoofed to trick a recipient in receiving the communication. Despite efforts to eliminate these malicious efforts, there are still many instances where hacking and spamming efforts successfully reach a recipient.

SUMMARY

The exemplary embodiments disclose a method, a computer program product, and a computer system for transmitting an authenticated communication. The method comprises transmitting, by the sending device, a request to an authentication server indicating that the authenticated communication is to be transmitted. The method comprises receiving, by the sending device, a security token from a security device that is co-located with the sending device. The security token is received by the security device from the authentication server. The method comprises generating, by the sending device, the authenticated communication by incorporating the security token in a communication. The method comprises transmitting, by the sending device, the authenticated communication to a recipient device.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
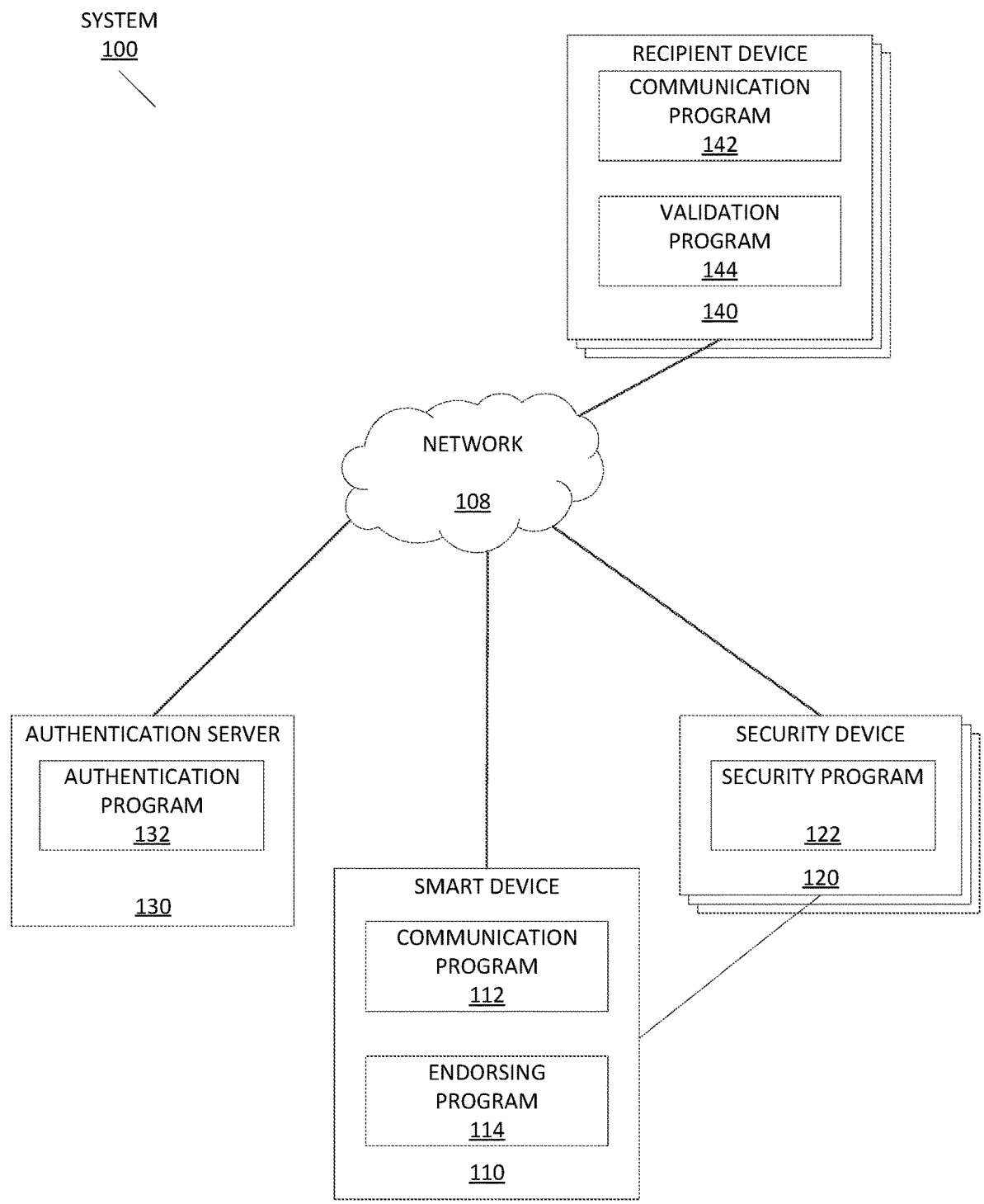
FIG. 1 depicts an exemplary schematic diagram of a communication authentication system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for transmitting an authenticated communication through a cooperative effort utilizing a co-located security device. As will be described in greater detail herein, the exemplary embodiments are configured for a smart device that is to transmit a communication to a recipient device to generate the communication as an authenticated communication based on a security token that validates an origin of the communication for the recipient. The exemplary embodiments utilize the security device to receive the security token and transmit the security token to the smart device for the smart device to generate the authenticated communication. Upon receipt of the authenticated communication, the recipient device may extract the security token to validate the communication as one that is genuinely to be received. Accordingly, the exemplary embodiments describe an authentication mechanism for a communication to be properly exchanged between devices that eliminate malicious efforts. Key benefits of the exemplary embodiments may include identifying bad actors and preventing malicious efforts involving impersonators, thievery, etc. Detailed implementation of the exemplary embodiments follows.

Conventional approaches to preventing an act of transmitting a communication with malicious intent involve various protocols. For example, a robocall may be considered a communication with malicious intent from the perspective of the recipient as the communication may be unwanted and may be transmitted with a spoofed identity that does not properly identify the sender. To address robocalls, a pair of network protocols has been developed. Specifically, a secure telephone identity revisited and signature-based handling of asserted information using tokens (STIR/SHAKEN) approach may use digital certificates to ensure that the calls a customer receives are not originating from a spoofed number. Once calls are widely authenticated, a consumer or recipient may know when a number is likely to be a robocall. Government agencies that oversee communications may also have advanced notice in tracking the source of the robocall. However, the STIR/SHAKEN approach does not provide a full solution to the issue of robocalls. For example, the STIR/SHAKEN approach does not identify the bad actor or prevent impersonators or thievery from occurring.

There have been further conventional approaches in addressing the issue of malicious efforts toward communications. For example, a conventional approach may utilize a consensus standard in which multiple devices communicate and work together to reduce authentication issues. However, this conventional approach does not validate a sender to detect whether a communication is being spoofed and not sent by an expected origin nor utilize a cooperative mechanism based on a co-located device. In another example, a conventional approach allows machine-to-machine communication in a network to allow and validate new devices and data as they enter the environment. However, this conventional approach does not utilize a cooperative mechanism based on a co-located device. The mechanism described according to the exemplary embodiments describe how to utilize devices to validate a payload (e.g., a communication) through a co-located device and a security token that detects whether the payload is originating from a spoofed source or unexpected origin.

The exemplary embodiments are described with regard to communications and validating the communication by exchanging an authenticated communication that is endorsed with a security token. However, the use of the communication is only exemplary and the exemplary embodiments may be directed to any data exchange in which a source is to be validated. For example, in another exemplary implementation, the exemplary embodiments may utilize the security token received from a co-located device for a data exchange over a network (e.g., data stored in a database is requested by an application running on a device). The security token may be incorporated in the payload of the data exchange such that the recipient of the data exchange may validate the source from which the data exchange is received. In this manner, the exemplary embodiments may be utilized and/or modified for use with any data that may be in the form of a communication or otherwise to authenticate and/or validate the parties involved in the exchange.

The exemplary embodiments are also described with regard to authenticating, confirming, validating, etc. a communication and parameters associated with the communication (e.g., identification of sender). These terms may be used interchangeably. However, for illustrative purposes and to differentiate between one program from another that is performed by a corresponding component of the system, the exemplary embodiments utilize respective terms as descriptors to the program while still performing one or more operations related to authenticating, confirming, validating, etc.

FIG. 1 depicts a communication authentication system 100, in accordance with the exemplary embodiments. According to the exemplary embodiments, the communication authentication system 100 may include a smart device 110, one or more security devices 120, an authentication server 130, and a recipient device 140, which may all be interconnected via a network 108. While programming and data of the exemplary embodiments may be collectively stored and accessed remotely across several servers via the network 108, programming and data of the exemplary embodiments may alternatively or additionally be collectively stored locally on as few as one physical computing device or amongst other computing devices than those depicted.

In the exemplary embodiments, the network 108 may be a communication channel capable of transferring data between connected devices. Accordingly, the components of the communication authentication system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the communication authentication system 100 that do not utilize the network 108. In an exemplary implementation where the network 108 is not utilized and two or more components are co-located, the components of the communication authentication system 100 may communicate using proximity-based data exchange protocols such as near field communication (NFC) mechanisms.

In the exemplary embodiments, the smart device 110 may include a communication program 112 and an endorsing program 114 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 6, as part of a cloud implementation with reference to FIG. 7, and/or as utilizing functional abstraction layers for processing with reference to FIG. 8.

In the exemplary embodiments, the communication program 112 may act as a client in a client-server relationship and may be a software, hardware, and/or firmware based application capable of allowing a user associated with the smart device 110 to transmit a communication via the network 108. In embodiments, the communication program 112 may operate as a user interface allowing a user to interact with one or more components of the communication authentication system 100, and utilize various wired and/or wireless connection protocols for data transmission and exchange associated with establishing a communication session, including Bluetooth, 2.4 gHz and 5 gHz internet, near-field communication, Z-Wave, Zigbee, etc.

The communication program 112 may allow the user of the smart device 110 to communicate with one or more users of respective recipient devices 140. The communication program 112 may present a user interface on which the user may enter an identity of the one or more users associated with respective recipient devices 140. Accordingly, the communication program 112 may be configured with a contact list or contacts feature in which a list of pre-stored recipients may be accessed. The communication program 112 may also be configured to manually receive a recipient (e.g., a number pad for a phone call, a "TO" field for an email, etc.). Through the user interface, the communication program 112 may allow the user of the smart device 110 to select a manner in which to send the communication. For example, the communication program 112 may be configured to transmit a text based communication (e.g., a SMS message), a voice based communication (e.g., a telephone call), a video based communication (e.g., a video call), a combination thereof, etc. In this manner, the communication program 112 may represent a program configured with a plurality of communication mechanisms or a plurality of individual programs configured with respective one or more communication mechanisms.

According to the exemplary embodiments, the communication program 112 may further be configured to modify the communication. For example, the communication program 112 may generate the communication as an authenticated communication. As will be described in further detail below, the communication program 112 may receive a security token that is included in the communication. In incorporating the security token, the communication program 112 may convert the communication into the authenticated communication.

To generate the authenticated communication, at any time prior to transmission, the user of the smart device 110 may request that the communication be transmitted as an authenticated communication. In an example of requesting the authenticated communication, through the user interface provided by the communication program 112, in a manual and/or ad hoc approach, the user of the smart device 110 may select an option to request the use of the authenticated communication. When using this approach, the user of the smart device 110 may select the option to request the use of the authenticated communication at various times before transmission. For example, the user of the smart device 110 may select the option prior to or after selecting the recipient (e.g., when the communication is a phone call), upon drafting the communication (e.g., when the communication is an email), etc. In another example of requesting the authenticated communication, through the user interface provided by the communication program 112, in an automated approach, the user of the smart device 110 may select a setting that requests the use of the authenticated communication when transmitting a communication via the communication program 112. The user of the smart device 110 may enter further inputs into the settings such that the authenticated communication is used according to, for example, a type of communication mechanism, an identity of the recipient, etc.

The endorsing program 114 may be configured to receive the security token that is provided to the communication program 112 so that the communication may be transmitted as an authenticated communication. Initially, the endorsing program 114 is shown as a separate program from the communication program 112. However, the endorsing program 114 being separate from the communication program 112 is only illustrative. In another exemplary embodiment, the endorsing program 114 may be a module or represent one or more operations of the communication program 112 in furtherance of transmitting an authenticated communication.

The endorsing program 114 may allow the user of the smart device 110 to register or associate one or more security devices 120 with the user of the smart device 110 and/or one or more smart devices 110 that the user may use. By associating the smart device 110 and/or the user of the smart device 110 to the security device 120, the endorsing program 114 may be configured to receive the security token from the registered security device 120. In this manner, the endorsing program 114 may prevent a malicious attempt in receiving the security token from a third party device that is not registered with the smart device 110 and/or the user of the smart device 110. In registering the security devices 120, the endorsing program 114 may provide a user interface on which the user of the smart device 110 may enter unique identification information corresponding to the security device 120. As will be described in further detail below, the user of the smart device 110 may use the security device 120 to complete the registration of the security device 120. The exemplary embodiments may utilize any secure mechanism to register the security device 120 with the smart device 110 and/or the user of the smart device 110. For example, the exemplary embodiments may utilize a cooperative code mechanism in which a code received on the smart device 110 is input on the security device 120. In another example, the exemplary embodiments may utilize a key pairing mechanism to register the security device 120 to the smart device 110 and/or the user of the smart device 110.

As a result of the security device 120 being registered with the smart device 110 and/or the user of the smart device 110, the endorsing program 114 may listen for the security token. For example, as a result of the use of the authenticated communication, the endorsing program 114 may listen for the security token being transmitted or broadcast by the one or more security devices 120 that are registered. Thus, prior to transmission of the communication, the endorsing program 114 mat receive the security token from the security device 120 and provide the security token to the communication program 112 for inclusion in the communication to generate the authenticated communication.

The exemplary embodiments are described with regard to utilizing a security token that endorses the communication to generate the authenticated communication. The exemplary embodiments may therefore utilize an endorsing mechanism in which an approval of the communication is indicated as being from a genuine origin (e.g., the user of the smart device 110). However, the use of the security token is only illustrative. For example, the security token may represent any component from which a communication may be authenticated, confirmed, validated, etc. The exemplary embodiments may utilize any element to transmit a communication as an authenticated communication. For example, the exemplary embodiments may utilize signatures, keys, etc.

In the exemplary embodiments, the security device 120 may include a security program 122 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. In embodiments, the security device 120 may be a smart vehicle, a smart watch, an IOT household device, an IOT office device, etc. While the security device 120 is shown as a single device, in other embodiments, the security device 120 may be comprised of a cluster or plurality of computing devices, in a modular manner, etc., working together or working independently. The security device 120 is described in greater detail as a hardware implementation with reference to FIG. 6, as part of a cloud implementation with reference to FIG. 7, and/or as utilizing functional abstraction layers for processing with reference to FIG. 8.

According to the exemplary embodiments, the security device 120 may be a device that is co-located with the smart device 110. The proximity or co-location of the security device 120 to the smart device 110 may be based on a data exchange protocol to be used in exchanging the security token from the security device 120 to the smart device 110. For example, if the data exchange protocol is a NFC protocol (e.g., a direct data exchange between the smart device 110 and the security device 120 such as Bluetooth, laser/subsonic audio, etc.), the security device 120 may be co-located with the smart device 110 up to a range supported by the NFC protocol. Thus, when the security device 120 is within an operating range of the NFC protocol relative to the smart device 110, the security device 120 may be considered co-located with the smart device 110. In another example, if the data exchange protocol is based on a network protocol (e.g., a WiFi protocol), the security device 120 may be co-located with the smart device 110 while both devices are associated with a common network (e.g., the WiFi network). In an exemplary implementation, the network protocol may be one where the devices may be located within a threshold proximity such that a network having a relatively large operating area may still be limited for use with the exemplary embodiments. For example, various mechanisms that determine a relative position of the security device 120 and/or the smart device 110 in a network area may be used (e.g., ping time, signal directionality, etc.). In determining a distance from one another, the security device 120 may be configured to determine whether the security device 120 is co-located and perform subsequent operations.

In the exemplary embodiments, the security program 122 may act as a client in a client-server relationship and may be a software, hardware, and/or firmware based application capable of exchanging a security token via the network 108 or through a direct data exchange. In embodiments, the security program 122 may operate as a user interface allowing a user to register or associate the security device 120 with the user of the smart device 110 and/or with the smart device 110, and utilize various wired and/or wireless connection protocols for data transmission and exchange associated with establishing a communication session, including Bluetooth, 2.4 gHz and 5 gHz internet, near-field communication, Z-Wave, Zigbee, etc.

As described above, the endorsing program 114 may allow a user of the smart device 110 to provide identification information of the security device 120 that is to be registered with the smart device 110 and/or the user of the smart device 110. In providing the identification information that uniquely identifies the security device 120, the user of the security device 120 may complete the registration process using the security program 112. Again, there may be a variety of mechanisms that may be used in registering the security device 120 with the smart device 110. For example, in using a cooperative code mechanism, the user of the smart device 110 may enter information regarding the security device 120 that is to be registered. Through the endorsing program 114, the smart device 110 may receive a code. The user may then use the security program 122 to enter the code that was received through the smart device 110 to complete the registration. Further manners of completing the registration may include a socket connection that remains connected, a local encrypted security key, etc. Further mechanisms that may be used in completing the registration include utilizing a MAC address of the security device 120, an identity of the WiFi network that the security device 120 is associated, a single use authenticator that expires when the device drops access greater than a predetermined amount of time, etc.

As a registered security device 120 and as a result of being co-located or satisfying conditions to be co-located, the security program 122 may be configured to receive a security token when the smart device 110 is to transmit a communication as an authenticated communication. As a result of receiving the security token, the security program 122 may be configured to provide the security token to the smart device 110. For example, the security program 122 may be configured to transmit the security token to the smart device 110 through the data exchange protocol or mechanism that is be used (e.g., a direct data transfer, via the network 108, etc.). In another example, the security program 122 may be configured to broadcast the security token so that the smart device 110 that is set for listening may receive the security token when the smart device 110 is within a broadcast range of the security device 120.

In the exemplary embodiments, the authentication server 130 may include an authentication program 132 and act as a server in a client-server relationship with the communication program 112 and the endorsing program 114 of the smart device 110 and the security program 122 of the security device 120. The authentication server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the authentication server 130 is shown as a single device, in other embodiments, the authentication server 130 may be comprised of a cluster or plurality of computing devices, working together or working independently. The authentication server 130 is described in greater detail as a hardware implementation with reference to FIG. 6, as part of a cloud implementation with reference to FIG. 7, and/or as utilizing functional abstraction layers for processing with reference to FIG. 8.

In the exemplary embodiments, the authentication program 132 may be a software, hardware, and/or firmware application configured to facilitate a communication to be transmitted as an authenticated communication. In furtherance of the operations described for the endorsing program 114 and the security program 122, in an example operation, the authentication program 132 may be configured to register the security device 120 with the smart device 110 and/or a user of the smart device 110. The authentication program 132 may receive an identification of the security device 120 from the endorsing program 114 of the smart device 110. Subsequently, the security device 120 may complete the registration process through the various registration mechanisms that may be utilized by the exemplary embodiments. In alternative registration processes, the endorsing program 114 and the security program 122 may perform the registration starting with an operation performed by the security program 122 (e.g., the security program 122 provides registration information and identifies the smart device 110 such that the smart device 110 may then complete the registration process by, for example, accepting the request to register the security device 120) or in a concurrent manner with the endorsing program 114. The authentication program 132 may be configured to maintain a registry of the security devices 120 that are registered with the smart device 110 and/or the user of the smart device 110. Thus, as security devices 120 are added as registered devices or security devices 120 are removed as registered devices, the authentication program 132 may update the registry accordingly.

In another example operation, the authentication program 132 may receive a request from the communication program 112 that a communication is to be transmitted as an authenticated communication. As a result of receiving this request, the authentication program 132 may identify the security devices 120 that are registered with the smart device 110 and/or the user of the smart device 110. The authentication program 132 may also be configured to receive location information from the smart device 110 and the security device 120 to determine whether the security device 120 is within an acceptable range of the smart device 110 to be considered co-located. In this exemplary implementation, the authentication program 132 may filter the identified security devices 120 to those that satisfy the co-location condition (e.g., within a proximity threshold). As a result of identifying one or more of these security devices 120, the authentication program 132 may transmit a security token to the security program 122. As described above, the security program 122 may transmit or broadcast the security token so that the endorsing program 114 may receive the security token.

In transmitting the security token, the authentication program 132 may be configured to utilize any security feature to ensure that the security token is tamper proof, spoof proof, etc. For example, the authentication program 132 may encrypt the security token. In another example, the security program 122 or the endorsing program 114 that receives the security token may encrypt the security token for inclusion in the authenticated communication. The authentication program 132 may be privy to the encryption scheme that may be used for subsequent decryption at a later stage.

In the exemplary embodiments, the recipient device 140 may include a communication program 142 and a validation program 144 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the recipient device 140 is shown as a single device, in other embodiments, the recipient device 140 may be comprised of a cluster or plurality of computing devices, in a modular manner, etc., working together or working independently. The recipient device 140 is described in greater detail as a hardware implementation with reference to FIG. 6, as part of a cloud implementation with reference to FIG. 7, and/or as utilizing functional abstraction layers for processing with reference to FIG. 8.

In the exemplary embodiments, the communication program 142 may act as a client in a client-server relationship and may be a software, hardware, and/or firmware based application capable of allowing a user associated with the recipient device 140 to receive a communication via the network 108. In embodiments, the communication program 142 may operate as a user interface allowing a user to interact with one or more components of the communication authentication system 100, and utilize various wired and/or wireless connection protocols for data transmission and exchange associated with establishing a communication session, including Bluetooth, 2.4 gHz and 5 gHz internet, near-field communication, Z-Wave, Zigbee, etc.

The communication program 142 may be substantially similar to the communication program 112 of the smart device 110. Accordingly, the communication program 142 may allow the user of the recipient device 140 to communicate with the smart device 110 using a variety of data exchange mechanisms. The communication program 112 and the communication program 142 may be configured to exchange communications. For example, both the communication program 112 and the communication program 142 may be configured to transmit and receive communications. In another example and for purposes of the exemplary embodiments, the communication program 112 may be configured at least to transmit a communication while the communication program 142 may be configured at least to receive a communication.

According to the exemplary embodiments, the validation program 144 may be configured to authenticate, confirm, validate, etc. a source from which the authenticated communication is received. As a result of receiving the authenticated communication, the validation program 144 may be configured to extract the security token that is included in the authenticated communication. In extracting the security token, the validation program 144 may request confirmation that the authenticated communication is being received from the smart device 110 and/or not being received from an improper source (e.g., third party malicious attempt). The validation program 144 may transmit the confirmation request to the authentication program 132 that transmits an indication as to whether the security token received from the recipient device 140 is valid based on the security token that was transmitted to the security device 120. For example, when encrypted, the authentication program 122 may utilize a decryption operation to verify that the security token is the same security token or based on the same security token that was supplied for the authenticated communication. In this manner, the security token may be specific to the authenticated communication, to the user of the smart device 110, to the smart device 110, etc.

The above description provides individual operations performed by components of the communication authentication system 100. For example, the above describes the operations from a perspective of the components of the communication authentication system 100. The following describes an overall process in which the components of the communication authentication system 100 interact with one another.

As a preliminary operation, the user of the smart device 110 may register the security device 120 with the smart device 110. Accordingly, the user of the smart device 110 may utilize the endorsing program 114 to provide information of the security device 120 to the authentication program 132. Through various registration mechanisms, the user who may also utilize the security device 120 may complete the registration of the security device with the smart device 110 via the security program 122.

When the user of the smart device 110 selects to transmit a communication to the recipient device 140, the user may enter the identity of the user of the recipient device 140 and/or the identity of the recipient device 140. The user may also select an option to use the authenticated communication in an active manner (e.g., manually selecting for this specific authenticated communication) or in a passive manner (e.g., based on a pre-selected setting). The user may utilize the communication program 112 to generate a payload of the communication that is to be transmitted as an authenticated communication. The communication program 112 may also transmit an indication to the authentication program 132 of the desire to use the authenticated communication. The authentication program 132 may identify the security device 120 as being registered with the smart device 110. Accordingly, the authentication program 132 may transmit a security token to the security program 122. The security program 122 may transmit or broadcast the security token so that the endorsing program 114 may receive the security token which is passed to the communication program 112. The communication program 112 may thereby generate the authenticated communication by incorporating the security token with the communication. The authenticated communication may be transmitted to the recipient device 140. The recipient device 140 may extract the security token from the authenticated communication and request confirmation from the authentication program 132. When the authenticated communication has been confirmed, the user of the recipient device 140 may receive the communication for viewing, listening, etc. via the communication program 142.

Figure 2:
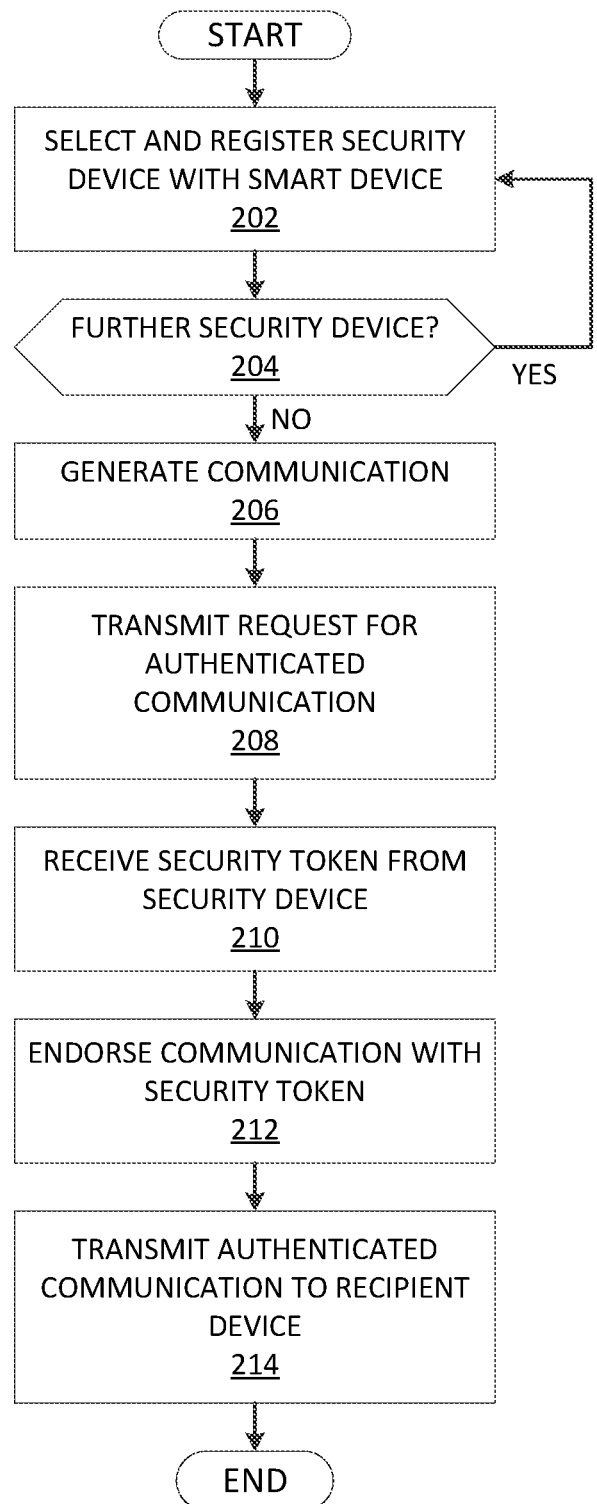
FIG. 2 depicts an exemplary flowchart of a method illustrating the operations of a communication program 112 and an endorsing program 114 of the communication authentication system 100 in transmitting an authenticated communication, in accordance with the exemplary embodiments.

FIG. 2 depicts an exemplary flowchart of a method 200 illustrating the operations of the communication program 112 and the endorsing program 114 of the communication authentication system 100 in transmitting an authenticated communication, in accordance with the exemplary embodiments. The method 200 is described from the perspective of the smart device 110 in transmitting the authenticated communication to the recipient device 140.

As part of an initial process and/or in response to a request to transmit an authenticated communication, the endorsing program 114 may select and register the security device 120 with the smart device 110 (step 202). A user of the smart device 110 may utilize a user interface of the endorsing program 114 to provide information that uniquely identifies the security device 120 that is to be registered with the smart device 110 and/or the user of the smart device 110. As described above, the endorsing program 114 may perform a part of the registration process that identifies the security device 120 where the security device 120 subsequently, previously, or concurrently completes the registration process. In an alternative embodiment, if sufficient information is provided that identifies the security device 120 (e.g., a unique identification such as a product code), the endorsing program 114 may be configured to unilaterally register the security device 120. Also in an alternative embodiment, the user of the smart device 110 may register the security device 120 at a time that the authenticated communication is to be transmitted. In this manner, the security device 120 may have a presumption of being available for use to receive the security token for the authenticated communication to be transmitted.

To further illustrate the operations of the recommendation program 132, reference is now made to an illustrative exemplary embodiment. According to the illustrative exemplary embodiment, the smart device 110 may be a smart phone and the security device 120 may be a smart IOT household device such as a smart refrigerator. The smart phone and the smart refrigerator may be associated with a common WiFi network and be within a distance from one another that satisfies a proximity threshold. The illustrative exemplary embodiment may also utilize a registration process that is performed prior to a communication being transmitted. Thus, according to the illustrative exemplary embodiment, the smart refrigerator may be pre-registered with the smart phone. The registration process may be a cooperative mechanism in which the smart phone and the smart refrigerator perform at least one operation in the registration process. For example, the smart phone may contact the authentication program 132 to request registering the smart refrigerator with the smart phone. The user of the smart phone may enter information of the smart refrigerator (e.g., a product code, a WiFi network to which the smart refrigerator is associated, a product type, a product location, etc.). The authentication program 132 may then provide, for example, a one time authentication code with a predetermined expiry timer triggered upon transmission of the authentication code. The user of the smart phone and the smart refrigerator may utilize a user interface of the security program 122 to enter the authentication code which is transmitted to the authentication program 132 to complete the registration process. At this stage, the smart refrigerator may be registered with the smart phone.

The endorsing program 114 may determine whether there are further security devices 120 to register with the smart device 110 (decision 204). The exemplary embodiments may avail the smart device 110 with a plurality of security devices 120 that may be used in transmitting an authenticated communication. For example, the security devices 120 may be at various positions where some security devices 120 may be mobile (e.g., a smart vehicle) while others may be stationary (e.g., a smart IOT household device). In this manner, by registering a plurality of security devices 120, the smart device 110 may be capable of transmitting the authenticated communication while the smart device 110 is in various positions and at least one registered security device 120 is co-located. If there is at least one further security device 120 to be registered (decision 204, "YES" branch), the endorsing program 114 may be used to continue registering the at least one further security device. If the one or more security devices 120 have been registered (decision 204, "NO" branch), the endorsing program 114 may conclude the registration process.

According to the previously introduced exemplary embodiment, the user may have additional security devices 120 that may be used to cooperatively transmit an authenticated communication. For example, the user may also use a smart car, have at least one further portable smart device such as a tablet, have a further smart IOT device such as a console, etc. The user of the smart device 110 may also register these devices as security devices 120. However, for purposes of the illustrative exemplary embodiment, the smart refrigerator may satisfy the co-location condition of being within the proximity threshold while the other registered security devices are positioned outside the proximity threshold.

The communication program 112 may generate a communication that is to be transmitted (step 206). For example, a user of the smart device 110 may utilize a user interface of the communication program 112 to generate a payload of the communication, establish a communication session, etc. Accordingly, the communication being generated may represent a communication that is generated and transmitted (e.g., a text based communication such as a text, an email, etc.). The communication being generated may also represent a process in which to contact the recipient device 140 for a communication session to be performed (e.g., a phone call, a video call, etc.).

With reference again to the previously introduced exemplary embodiment, the user of the smart phone may be composing an email bound for the recipient device 140 where the communication program 112 is an email client. Thus, the user may enter an email address corresponding to the user of the recipient device 140 or select a name in an email address book stored for use by the email client. The user may also enter text in a message comprising a body of the email.

The communication program 112 may transmit a request to the authentication program 132 to transmit the communication as an authenticated communication (step 208). For example, the communication program 112 may be configured with a selection on the user interface for the user to select an option to utilize the authenticated communication according to the exemplary embodiments. Upon selection of this option, the communication program 112 may contact the authentication program 132 to request operations be performed in furtherance of using the authenticated communication. In another example, the communication program 112 may be configured with settings that allow the user to pre-select when the authenticated communication is used and the request is transmitted to the authentication program 132. The settings that indicate when to use the authenticated communication may indicate a type of communication, an identity of the recipient device 140, an identity of a user, etc.

Referring now to the previously introduced, illustrative exemplary embodiment, the user of the smart phone may exercise an option as presented in the user interface to request the authentication program 132 to perform operations that facilitate the transmission of the authenticated communication. For example, the user interface may include an icon to select the option. The communication program 112 may transmit the request at a variety of times. According to the exemplary embodiments, prior to the transmission of the authenticated communication, the communication program 112 may transmit the request. For example, upon selection of the option, the communication program 112 may transmit the request. In another example, upon the user indicating that the communication is to be transmitted, the communication program 112 may transmit the request.

The endorsing program 114 may receive a security token from the registered security device 120 (step 210). In response to receiving the request from the communication program 112, the authentication program 132 may identify the security device 120 and transmit a security token that is to be used with the authenticated communication to the security device 120. Through a data exchange mechanism based on the co-location of the smart device 110 and the security device 120 (e.g., a NFC protocol), the security device 120 may transmit or broadcast the security token so that the endorsing program 114 that is listening for the security token may receive it.

With reference again to the illustrative exemplary embodiment, as a result of the request being transmitted and the smart refrigerator receiving the security token, the endorsing program 114 may be configured to listen for the security token after transmitting the request. The smart refrigerator may receive the security token with an indication of the smart phone to which the security token is to be transmitted. The illustrative exemplary embodiment may utilize a direct NFC data exchange mechanism or utilize a WiFi network to which both the smart phone and the smart refrigerator are associated. The smart refrigerator may then transmit the security token to the endorsing program 114 via the NFC or WiFi data exchange mechanism.

The endorsing program 114 may provide the security token to the communication program 112 such that the communication program 112 endorses the communication with the security token to generate the authenticated communication (step 212). The communication program 112 may utilize any mechanism in which to incorporate the security token to the communication to generate the authenticated communication. For example, the communication program 112 may insert the security token in a header of the data package of the communication. In another example, the communication program 112 may encrypt a payload of the communication based on the security token. As a result of generating the authenticated communication, the communication program 112 may transmit the authenticated communication to the recipient device 140 via the network 108 (step 214).

Continuing with the illustrative exemplary embodiment, the endorsing program 114 may provide the security token to the communication program 112. The communication program 112 may insert the security token into a header of the data package corresponding to the communication. In this manner, the communication program 112 converts the communication into an authenticated communication. The communication program 112 may then transmit the authenticated communication. For example, if the communication is an email, the communication program 112 may transmit the email that includes the security token. In another example, if the communication is a phone call, the communication program 112 may transmit a request to establish the phone call where the request includes the security token.

Figure 3:
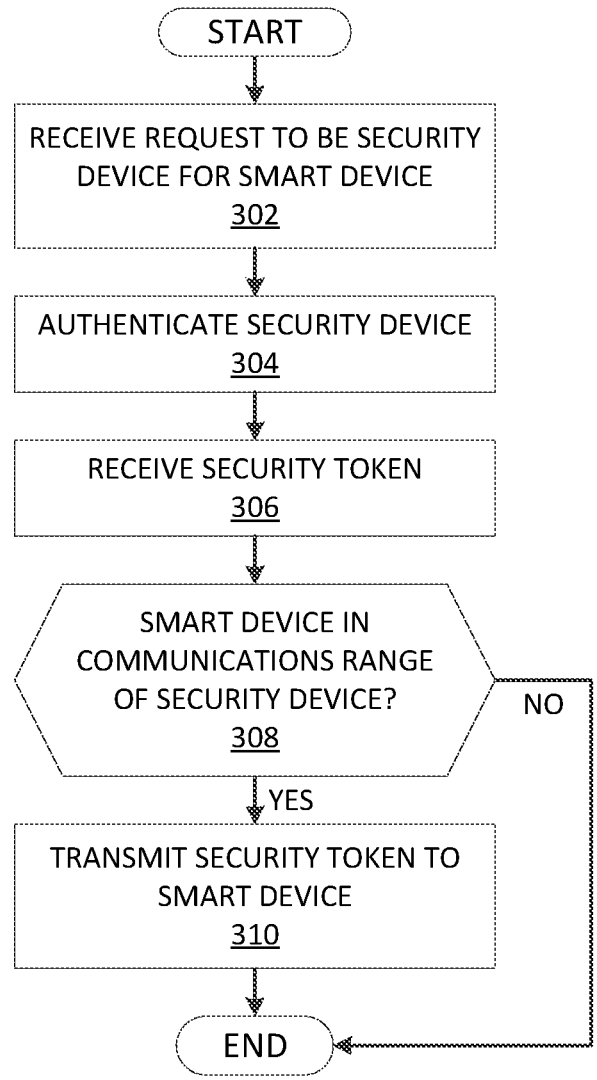
FIG. 3 depicts an exemplary flowchart of a method illustrating the operations of a security program 122 of the communication authentication system 100 in transmitting an authenticated communication, in accordance with the exemplary embodiments.

FIG. 3 depicts an exemplary flowchart of a method illustrating the operations of a security program 122 of the communication authentication system 100 in transmitting an authenticated communication, in accordance with the exemplary embodiments. The method 300 is described from the perspective of the security device 120 in cooperating with the smart device to transmit the authenticated communication to the recipient device 140.

The security program 122 may receive a request to be registered with the smart device 110 to cooperatively transmit an authenticated communication (step 302). The request to register as the security device 120 may be performed in a variety of manners. For example, the security program 122 may provide a user interface in which an authentication code is entered and transmitted to the authentication program 132 to complete the registration. In another example, the user of the security device 120 may utilize a user interface of the security program 122 to request that the security device 120 be registered with the smart device 110. In a further example, the security device 120 may passively be registered when the smart device 110 unilaterally registers the security device 120. In completing the registration, the security program 122 may authenticate the security device 120 as registered with the smart device 110 and/or the user of the smart device 110 (step 304).

To further illustrate the operations of the recommendation program 132, reference is again made to the illustrative exemplary embodiment described above in reference to FIG. 2. According to the illustrative exemplary embodiment, the security device 120 may be a smart refrigerator. The smart device 110 may have requested the smart refrigerator be registered and transmitted a request to the authentication program 132. The authentication program 132 may have transmitted an authentication code to the endorsing program 114 of the smart device 110. The user of the security device 120 may enter the authentication code for the security program 122 to complete the registration of the security device 120. Accordingly, the smart refrigerator may be authenticated as the security device 120.

The security program 122 may receive a security token from the authentication program 132 (step 306). As a result of the communication program 112 requesting the use of the authenticated communication, the authentication program 132 may generate a security token to be used with the authenticated communication. The authentication program 132 may identify the security device 120 as being registered with the smart device 110. The authentication program 132 may transmit the security token to be received by the security program 122.

According to the previously introduced exemplary embodiment, the smart refrigerator may receive the security token from the authentication program 132 via the network 108. As the security device 120, the smart refrigerator may be configured to listen for the security token as the smart device 110 may be used to transmit a communication at any time.

The security program 122 may determine whether the security device 120 is co-located with the smart device 110 (decision 308). According to an exemplary embodiment, the security program 122 may be configured to determine the co-location condition between the smart device 110 and the security device 120. For example, the security program 122 may verify that the security device 120 is co-located with the smart device 110 through various mechanisms (e.g., position location through network signal processing). Alternatively, the authentication program 132 may have determined whether the security device 120 and the smart device 110 are co-located prior to transmission of the security token. As a result of the smart device 110 and the security device 120 not being co-located (decision 308, "NO" branch), the security device 120 may be omitted from being used to cooperatively transmit the authenticated communication. As a result of the smart device 110 and the security device 120 being co-located (decision 308, "YES" branch), the security program 122 may transmit the security token to the smart device 110 through a co-location based data exchange mechanism such as a NFC protocol (step 310).

With reference again to the previously introduced exemplary embodiment, the security program 122 may be configured to determine a location of the smart phone relative to the smart refrigerator. For example, from being associated with a common WiFi network, the security program 122 may query a server of the WiFi network to provide signal direction and signal strength information for the smart phone and the smart refrigerator. The security program 122 may process this information to determine a distance between the smart phone and the smart refrigerator. The security program 122 may determine whether the distance satisfies a proximity threshold. As a result of the proximity threshold being satisfied such that the smart refrigerator is determined to be co-located with the smart phone, the security program 122 may transmit the security token to the smart phone.

Figure 4:
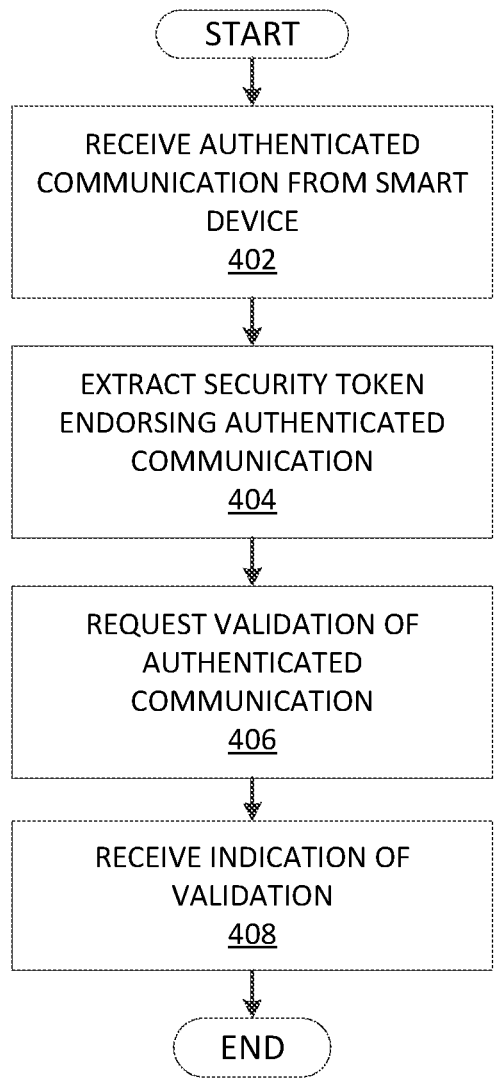
FIG. 4 depicts an exemplary flowchart of a method illustrating the operations of a communication program 142 and an authentication program 144 of the communication authentication system 100 in transmitting an authenticated communication, in accordance with the exemplary embodiments.

FIG. 4 depicts an exemplary flowchart of a method illustrating the operations of a communication program 142 and an authentication program 144 of the communication authentication system 100 in transmitting an authenticated communication, in accordance with the exemplary embodiments. The method 400 is described from the perspective of the recipient device 140 in receiving the authenticated communication transmitted from the smart device 110.

The communication program 142 may receive an authenticated communication from the smart device 110 (step 402). For example, the authenticated communication may be a text based communication that includes the security token. In another example, the authenticated communication may be a request to establish a voice or video communication where the request includes the security token.

To further illustrate the operations of the recommendation program 132, reference is again made to the illustrative exemplary embodiment described above in reference to FIG. 2. According to the illustrative exemplary embodiment, the recipient device 140 may be a tablet connected to the network 108. The smart phone may have transmitted an email generated as an authenticated communication to the tablet via the network 108 (e.g., the Internet).

The authentication program 144 may extract the security token that endorses the authenticated communication (step 404). In including the security token with the authenticated communication, the authentication program 144 may be configured to determine a location of the security token within the data package of the authenticated communication and extract the data corresponding to the security token.

According to the previously introduced exemplary embodiment, the authentication program 144 may determine that the security token is included in a header of the email. The authentication program 144 may extract the data of the security token from the header for further processing.

The authentication program 144 may request validation of the authenticated communication based on the security token (step 406). The authentication program 144 may transmit a request to the authentication program 132 and include the security token in the request. The authentication program 132 may determine a validity of the security token and generate an indication as a result of this determination. The validation program 144 may receive the indication of the validation from the authentication program 132 (step 408). As a result of the authenticated communication being validated, the communication program 142 may continue to process the authenticated communication. As a result of the authenticated communication being invalidated, the communication program 142 may prevent further processing of the authenticated communication.

With reference again to the previously introduced exemplary embodiment, the authentication program 144 may transmit a request with the security token extracted from the header of the data package of the email. The authentication program 144 may have received an indication that the authenticated communication has been validated (e.g., the security token corresponds to the security token that was provided to the smart phone). Based on this indication, the authentication program 144 may, for example, indicate that the communication program 142 may continue processing the email. For example, the communication program 142 may show the body of the email to the user of the tablet via the email client. However, if the authentication program 144 receives an indication that the authenticated communication is invalid (e.g., the security token does not correspond to the security token that was provided to the smart phone), the authentication program 144 may determine that the source of the email may not be genuine or originate from an unwanted source. Accordingly, the authentication program 144 may indicate that the communication program 142 prevent further processing. For example, if the communication is a request to establish a phone call, the authentication program 144 may be configured to instruct the communication program 142 to ignore the request. In this manner, this process may be performed passively from the perspective of the user of the tablet and the user of the tablet may not be bothered with a potential spoofed phone call.

Figure 5:
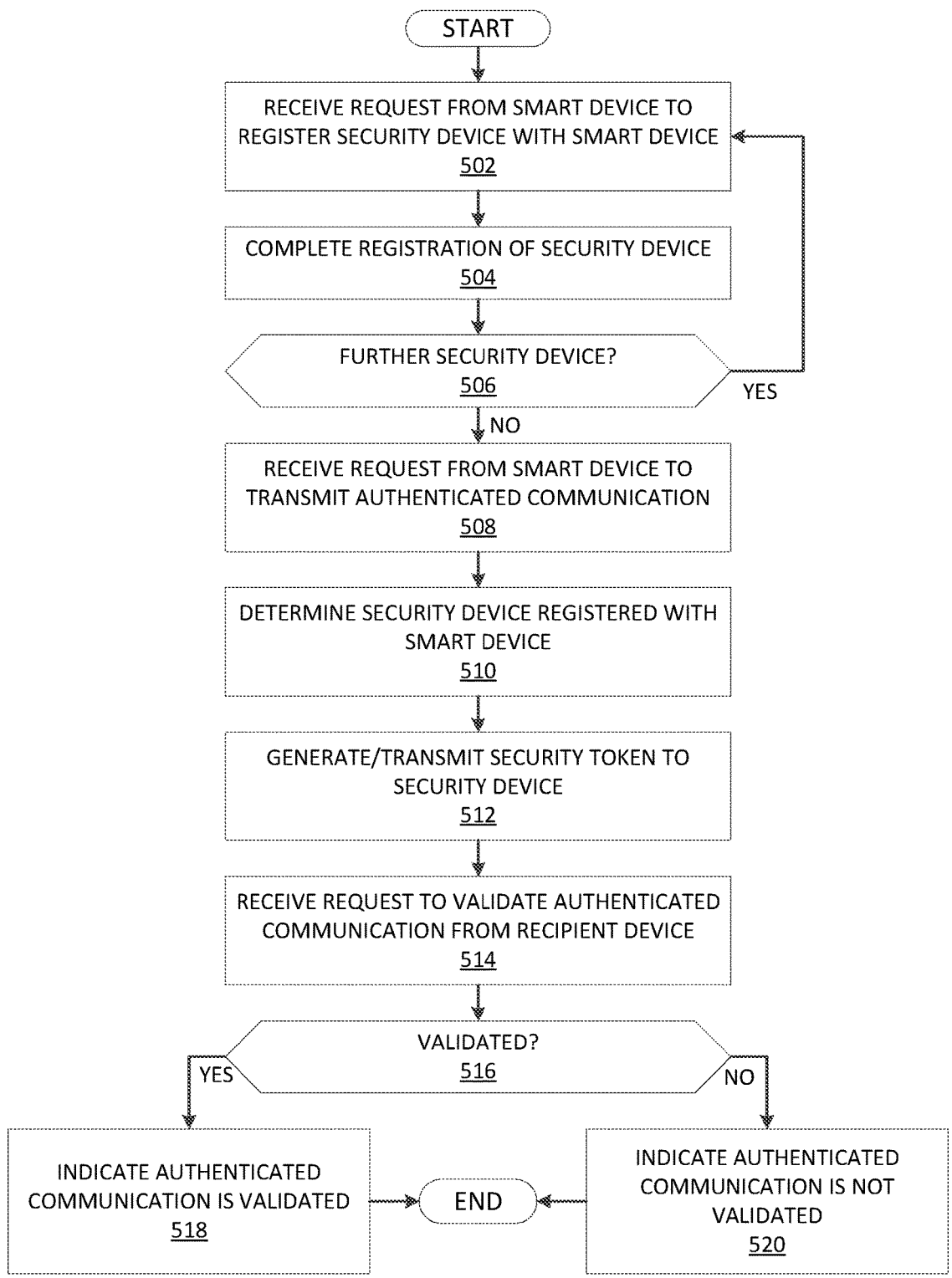
FIG. 5 depicts an exemplary flowchart of a method illustrating the operations of a validation program 132 of the communication authentication system 100 in transmitting an authenticated communication, in accordance with the exemplary embodiments.

FIG. 5 depicts an exemplary flowchart of a method illustrating the operations of a validation program 132 of the communication authentication system 100 in transmitting an authenticated communication, in accordance with the exemplary embodiments. The method 500 is described from the perspective of the authentication server 130 in transmitting the authenticated communication from the smart device 110 to the recipient device 140.

The authentication program 132 may receive a request from the smart device 110 to register the security device 120 with the smart device 110 (step 502). The authentication program 132 may facilitate the registration process between the smart device 110 and the security device 120 through various registration mechanisms. Accordingly, the authentication program 132 may complete the registration of the security device 120 using these registration mechanisms (step 504). For example, in receiving a request from the smart device 110, the authentication program 132 may provide an authentication code and transmit the authentication code back to the smart device 110. When the authentication code is received from the security device 120, the authentication program 132 may complete the registration process and list the security device 120 as being registered with the smart device 110. The authentication program 132 may continue to register as many security devices 120 with the smart device 110 (decision 506) where a further request for a further security device 120 entails a further registration processing (decision 506, "YES" branch). When the registration process is completed (decision 506, "NO" branch), the authentication program 132 may maintain a registry of the security devices 120 that are registered with the smart device 110 and/or a user of the smart device 110.

To further illustrate the operations of the recommendation program 132, reference is now again made to the illustrative exemplary embodiment described above in reference to FIG. 2. According to the illustrative exemplary embodiment, the authentication program 132 may receive a request from the endorsing program 114 on the smart phone where the request provides information of the smart refrigerator. For example, the information may be a product code, a product type, a WiFi network to which the smart refrigerator is associated, etc. The authentication program 132 may transmit an authentication code that is specific to the smart refrigerator back to the smart phone. The authentication program 132 may then receive the authentication code from the smart refrigerator to confirm and complete the registration of the smart refrigerator.

The authentication program 132 may receive a request from the smart device 110 to transmit an authenticated communication (step 508). Through an option exercised on the smart device 110, the smart device 110 may transmit a request to the authentication program 132. The request for the authenticated communication may be communication type agnostic as the resulting security token need only be incorporated in the authenticated communication for the exemplary embodiments to be used.

The authentication program 132 may determine the security device 120 that is registered with the smart device 110 (step 510). Through the aforementioned registration process, the authentication program 132 may access the registry to identify the one or more security devices 120 that may be used in cooperatively transmitting the authenticated communication. By identifying the security device 120, the authentication program 132 may generate and transmit a security token to the security device 120 (step 512). In an exemplary embodiment, the authentication program 132 may determine which of the security devices 120 are co-located with the smart device 110. However, in an alternative exemplary embodiment, the authentication program 132 may transmit the security token to each of the determined security devices 120 and the security device 120 may determine a result for the co-location condition. In generating the security token, the authentication program 132 may be configured to utilize various security mechanisms to ensure that the security token is secure for use. For example, the authentication program 132 may utilize an encryption process or a key pair (e.g., public or private) in generating the security token.

According to the previously introduced exemplary embodiment, the authentication program 132 may receive the request from the communication program 112 to utilize the authenticated communication. The authentication program 132 may determine that the smart phone has a plurality of registered security devices 120 including a smart refrigerator, a tablet, a smart car, etc. The illustrative exemplary embodiment may utilize a confirmation of being co-located based on the security device 120 performing the proper operations. Thus, the authentication program 132 may generate and transmit the security token to each of the registered security devices 120. However, as noted above, only the smart refrigerator may satisfy the co-location condition. Accordingly, the smart refrigerator may be responsible for transmitting the security token to the smart phone so that the smart phone may include the security token in the email generated as the authenticated communication. The smart phone may transmit the authenticated communication to the tablet recipient device 140.

The authentication program 132 may receive a request to validate the authenticated communication from the recipient device 140 (step 514). As a result of the recipient device 140 receiving the authenticated communication, the validation program 144 may validate the authenticated communication (decision 516). Thus, the validation program 144 may transmit a request to validate the authenticated communication using the security token that is extracted from the data package of the authenticated communication. The authentication program 132 may determine whether the security token received from the recipient device 140 corresponds to the security token transmitted to the smart device 110. For example, if the security token is a string of characters, the authentication program 132 may determine whether the string of characters match. In another example, if the security token is encrypted, the authentication program 132 may decrypt the encrypted security token and determine whether the data corresponds to the data transmitted to the smart device 110. As a result of the security token received in the request from the recipient device 140 being validated (decision 516, "YES" branch), the authentication program 132 may generate and transmit a proper indication that the authenticated communication is valid (step 518). As a result of the security token received in the request from the recipient device 140 not being valid (decision 516, "NO" branch), the authentication program 132 may generate and transmit a proper indication that the authenticated communication is invalid (step 520).

With reference again to the previously introduced exemplary embodiment, after transmitting the security token to the smart phone, the authentication program 132 may be in a listening mode for a request from the tablet. When the recipient device 140 has received the authenticated communication and is attempting to validate the authenticated communication, the authentication program 132 may receive the request for validation. If the security token received in the request from the tablet indicates that the authenticated communication is valid, the authentication program 132 may generate and transmit that the authenticated communication is valid which allows the tablet to further process the authenticated communication (e.g., allow opening the email to show the body of the email, establish a phone call, etc.). If the security token received in the request from the tablet indicates that the authenticated communication is invalid, the authentication program 132 may generate and transmit that the authenticated communication is invalid which prevents further processing of the authenticated communication.

The exemplary embodiments may provide a mechanism through a sender may transmit authenticated communications such that a recipient may safely receive the authenticated communications from a genuine source. The mechanism according to the exemplary embodiments may dispatch a security token to a security device that utilizes a shared local data exchange protocol to transmit the security token to the sending device. The security device being co-located may ensure that the proper sending device receives the security token. Thus, the exemplary embodiments utilize near traffic between the security device and the sending device to pass the security token. This automated process may provide a more efficient process than a manual entering of a code each time that an authenticated communication is to be transmitted that conventional approaches may utilize. The exemplary embodiments may be applicable in various environments including business to consumer (B2C) communications and business to business (B2B) communications.

Figure 6:
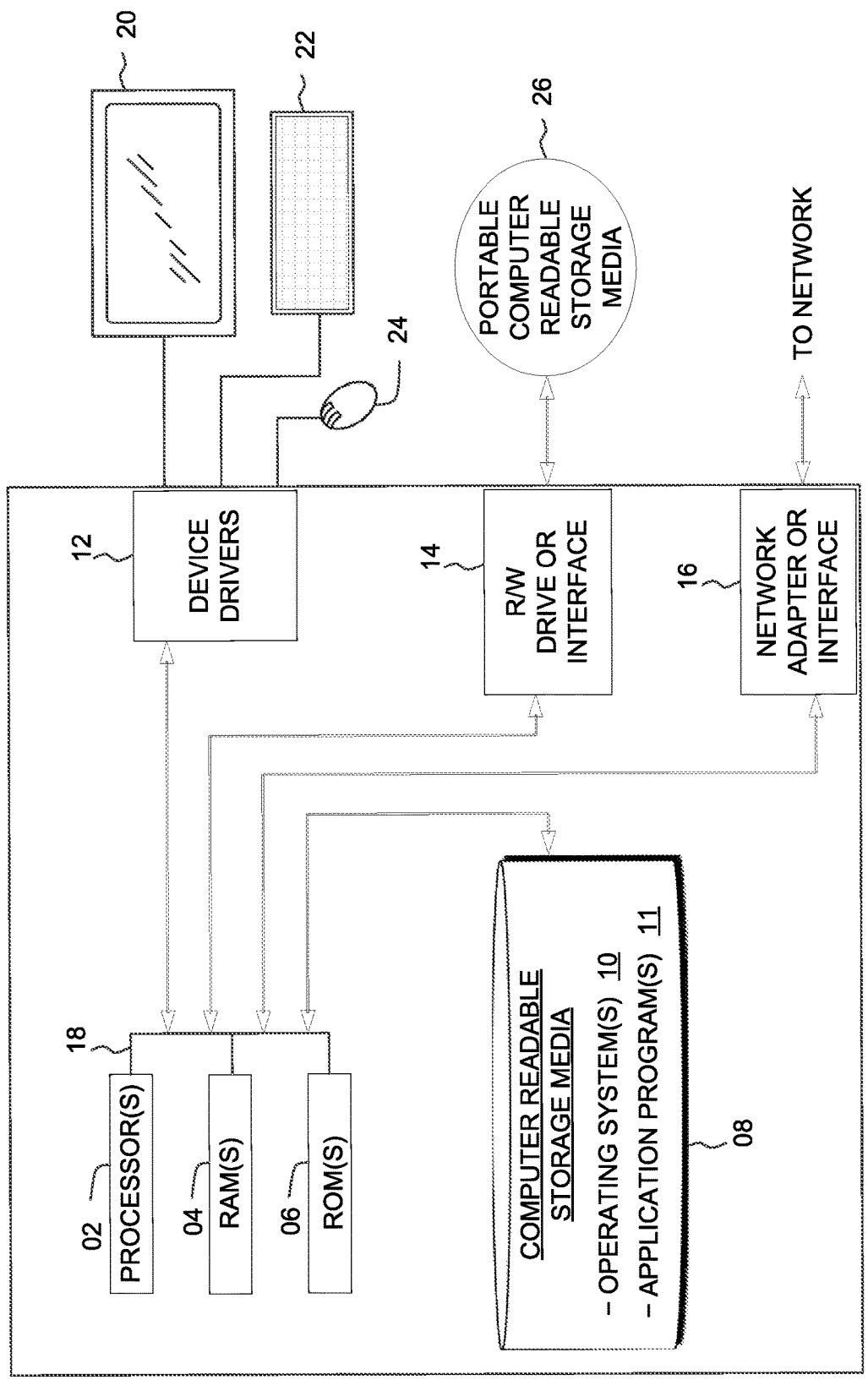
FIG. 6 depicts an exemplary block diagram depicting the hardware components of the communication authentication system 100 of FIG. 1, in accordance with the exemplary embodiments.

FIG. 6 depicts a block diagram of devices within the communication authentication system 100 of FIG. 1, in accordance with the exemplary embodiments. It should be appreciated that FIG. 6 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments.

Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
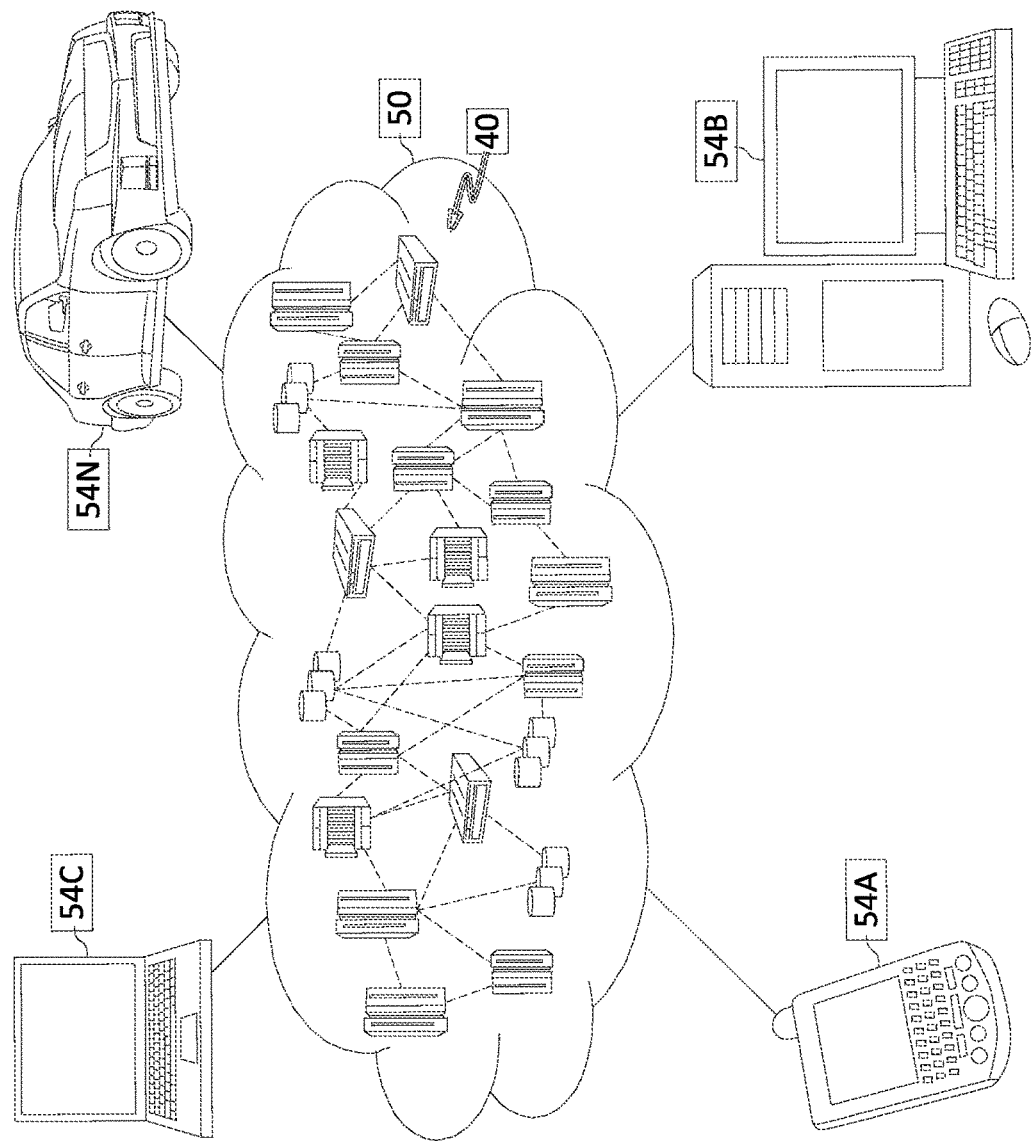
FIG. 7 depicts a cloud computing environment, in accordance with the exemplary embodiments.

Referring now to FIG. 7, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 40 and cloud computing environment 50 can communicate with any type of computerized device over any type of network and/or network addressable connection (e.g., using a web browser).

Figure 8:
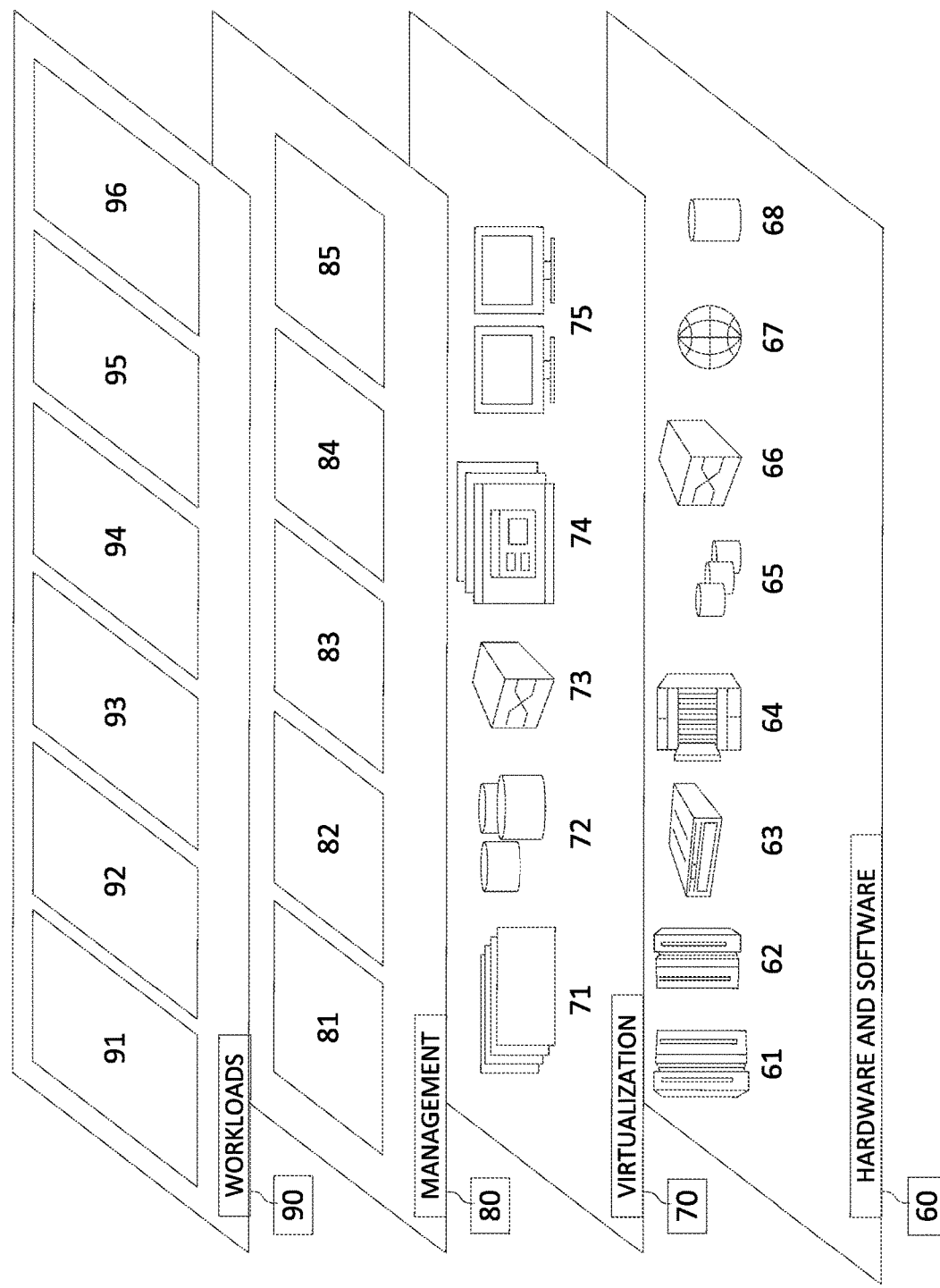
FIG. 8 depicts abstraction model layers, in accordance with the exemplary embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for transmitting an authenticated communication by a sending device, the method comprising:
   transmitting, by the sending device, a request to an authentication server indicating that the authenticated communication is to be transmitted;
   receiving, by the sending device, a security token from a security device that is co-located with the sending device, the security token being received by the security device from the authentication server;
   generating, by the sending device, the authenticated communication by incorporating the security token in a communication that is outgoing from a human user of the sending device to a human user of a recipient device; and
   transmitting, by the sending device, the authenticated communication to the recipient device,
   wherein the authenticated communication is configured to provide the security token to the recipient device such that the recipient device validates the authenticated communication with the authentication server by extracting the security token from the authenticated communication, wherein the communication is not presented to the human user of the recipient device until the recipient device validates the authenticated communication with the extracted security token.

2. The computer-implemented method of claim 1, wherein the transmitting the request further comprises:
   receiving, by the sending device, an indication from the user of the sending device to transmit the communication as the authenticated communication.

3. The computer-implemented method of claim 1, wherein the security device is registered with the sending device.

4. The computer-implemented method of claim 3, wherein, prior to the authenticated communication being transmitted, the method further comprises:
   transmitting, by the sending device, a further request to register the security device with the sending device, the further request including information identifying the security device.

5. The computer-implemented method of claim 1, wherein the sending device receives the security token from the security device based on a co-location based data exchange mechanism.

6. The computer-implemented method of claim 1, wherein the security device is co-located with the sending device when the security device and the sending device have a distance from one another that is within a proximity threshold.

7. The computer-implemented method of claim 1, wherein the communication is one of a text-based communication, a voice-based communication, a video-based communication, or a combination thereof.

8. A computer program product for transmitting an authenticated communication by a sending device, the computer program product comprising:
   one or more non-transitory computer-readable storage media and program instructions collectively stored on the one or more non-transitory computer-readable storage media capable of performing a method, the method comprising:
   transmitting, by the sending device, a request to an authentication server indicating that the authenticated communication is to be transmitted;
   receiving, by the sending device, a security token from a security device that is co-located with the sending device, the security token being received by the security device from the authentication server;
   generating, by the sending device, the authenticated communication by incorporating the security token in a communication that is outgoing from a human user of the sending device to a human user of a recipient device; and
   transmitting, by the sending device, the authenticated communication to the recipient device,
   wherein the authenticated communication is configured to provide the security token to the recipient device such that the recipient device validates the authenticated communication with the authentication server by extracting the security token from the authenticated communication, wherein the communication is not presented to the human user of the recipient device until the recipient device validates the authenticated communication with the extracted security token.

9. The computer program product of claim 8, wherein the transmitting the request further comprises:
   receiving an indication from the user of the sending device to transmit the communication as the authenticated communication.

10. The computer program product of claim 8, wherein the security device is registered with the sending device.

11. The computer program product of claim 10, wherein, prior to the authenticated communication being transmitted, the method further comprises:
   transmitting a further request to register the security device with the sending device, the further request including information identifying the security device.

12. The computer program product of claim 8, wherein the sending device receives the security token from the security device based on a co-location based data exchange mechanism.

13. The computer program product of claim 8, wherein the security device is co-located with the sending device when the security device and the sending device have a distance from one another that is within a proximity threshold.

14. The computer program product of claim 8, wherein the communication is one of a text-based communication, a voice-based communication, a video-based communication, or a combination thereof.

15. A computer system for transmitting an authenticated communication by a sending device, the computer system comprising:
   one or more computer processors, one or more computer-readable storage media, and program instructions collectively stored on the one or more of the computer-readable storage media for execution by at least one of the one or more processors capable of performing a method, the method comprising:
   transmitting, by the sending device, a request to an authentication server indicating that the authenticated communication is to be transmitted;
   receiving, by the sending device, a security token from a security device that is co-located with the sending device, the security token being received by the security device from the authentication server;
   generating, by the sending device, the authenticated communication by incorporating the security token in a communication that is outgoing from a human user of the sending device to a human user of a recipient device; and
   transmitting, by the sending device, the authenticated communication to the recipient device,
   wherein the authenticated communication is configured to provide the security token to the recipient device such that the recipient device validates the authenticated communication with the authentication server by extracting the security token from the authenticated communication, wherein the communication is not presented to the human user of the recipient device until the recipient device validates the authenticated communication with the extracted security token.

16. The computer system of claim 15, wherein the transmitting the request further comprises:
   receiving an indication from the user of the sending device to transmit the communication as the authenticated communication.

17. The computer system of claim 15, wherein the security device is registered with the sending device.

18. The computer system of claim 17, wherein, prior to the authenticated communication being transmitted, the method further comprises:
   transmitting a further request to register the security device with the sending device, the further request including information identifying the security device.

19. The computer system of claim 15, wherein the sending device receives the security token from the security device based on a co-location based data exchange mechanism.

20. The computer system of claim 15, wherein the security device is co-located with the sending device when the security device and the sending device have a distance from one another that is within a proximity threshold.

\* \* \* \* \*